No. 714,651. Patented Nov. 25, 1902.
T. H. MACDONALD.
RECORDING AND REPRODUCING SOUNDS.
(Application filed Dec. 5, 1898.)
(No Model.)
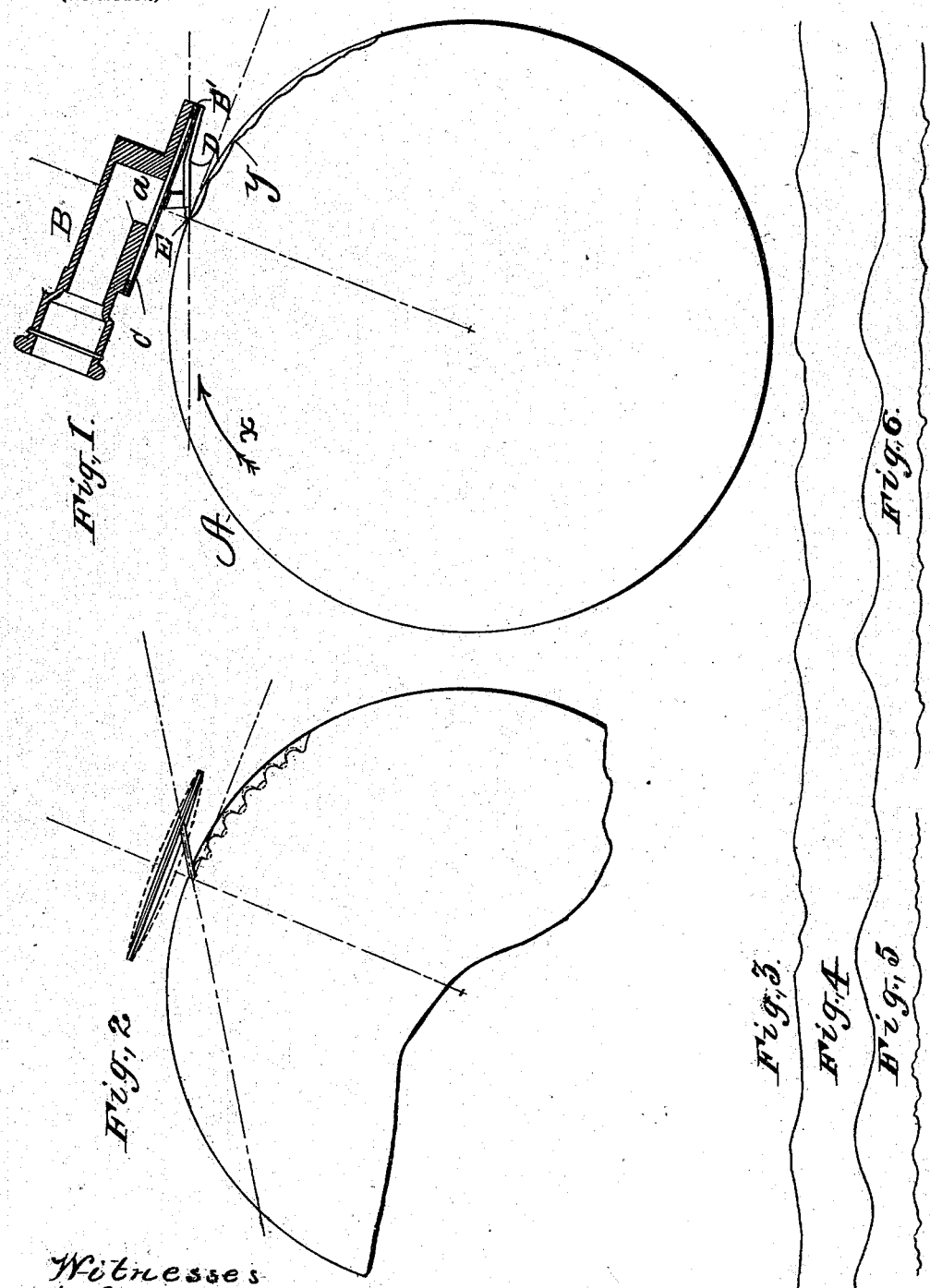

UNITED STATES PATENT OFFICE.

THOMAS H. MACDONALD, OF BRIDGEPORT, CONNECTICUT, ASSIGNOR TO THE AMERICAN GRAPHOPHONE COMPANY, A CORPORATION OF WEST VIRGINIA.

RECORDING AND REPRODUCING SOUNDS.

SPECIFICATION forming part of Letters Patent No. 714,651, dated November 25, 1902.

Application filed December 5, 1898. Serial No. 698,328. (No model.)

*To all whom it may concern:*

Be it known that I, THOMAS H. MACDONALD, of Bridgeport, Connecticut, have invented a new and useful Improvement in Recording and Reproducing Sounds, which invention is fully set forth in the following specification.

This invention relates to the art of recording and reproducing sounds; and its object is to obtain complete and accurate records and reproductions of articulate speech and of all other sounds practically the same in volume and tone color or quality as the original sounds.

It has long been realized by those skilled in the art that the best reproductions of sound obtained by the method patented by Bell and Tainter in 1886 and now in general use, besides being very small in volume compared with the original sounds, differed therefrom in character to a greater or less degree. These differences have been recognized as of two principal sorts: first, the absence of components characterizing the original sounds, (especially noticeable in closed sounds, aspirates, sibilants, and high-pitched sounds,) and, second, the presence of foreign sounds or characters. The latter difficulty has been attributed to various causes, generally to so-called "false" vibrations; but after every effort to overcome these difficulties and to eliminate false vibrations the characteristic differences stated above distinguishing the reproduced from the original sounds still remained very strongly marked.

The complete result of sound reproduction involves two operations: first, the making of the record, and, second, the reproducing of the recorded sound. The theoretical object is to cause the reproducing-diaphragm or vibratory member to copy exactly the movements of the recording-diaphragm. If this be done with mathematical exactness, the reproduced sound will be identical with the original. Failure to attain this result may obviously be due either to failure of the recording-style to make a groove which is an exact graphic representation of the sonorous vibrations or to a failure of the reproducing-style to follow exactly all the irregularities of the groove, so as to perform all the movements corresponding thereto and none other. The imperfection of the results hitherto attained is due, in fact, to both these causes; and the purpose of this invention, briefly stated, is to obtain accurate and complete representations in the form of a sound-groove of all sonorous vibrations and to cause the reproducing-diaphragm to vibrate strictly in accordance with said record, and thus copy in amplitude and character the motions of the recording-diaphragm.

It is difficult to make a close and accurate observation of what actually takes place in recording and reproducing sounds, because the movements, although of very complex character, are seldom more than one two-thousandths of an inch in amplitude and are at the rate of hundreds of complete vibrations to the second. By the aid of theory and careful microscopical investigations it has been possible to determine these operations with precision.

In making a record an important factor is the resistance of the recording medium to the movements of the style. To obtain the utmost freedom for the movements of the style and the maximum cutting effect, the axis of the style should be placed at as small an angle as practicable with the tangent of the cylindrical tablet (when that form is employed) at the point of contact, the smaller this angle the smaller being the resistance of the material to the cutting edge of the style. In practice the best results have heretofore been obtained when this angle is somewhat less than thirty-five degrees, it not being practical to make it much less. Under these conditions what occurs is that when the style begins to move into the recording material to cut a depression the heel of the cutter—that is, the portion behind the cutting edge—comes into contact with the crest that is being formed and checks the penetration of the style. Obviously the more the style is inclined toward the tangent the more effective is the check thus imposed on the movement of the style. Consequently the style will begin to descend in accordance with the characteristic acoustic vibration at the instant impressed on the diaphragm, but will begin to depart from the characteristic movement as soon as the checking influence is felt, and will depart from it altogether as soon as the resistance overcomes the force of the vibration, which is exceedingly feeble. A further consequence follows from the fact that the vibration of the diaphragm is pendulous in character and, like the strings of a musical instrument, when perfectly unrestrained moves in a full vibration the same distance to one side as to the other of its normal position; but, again, like the strings of an instrument, the diaphragm if checked or damped on one side of the medial line will be unable to perform its proper movement, either in amplitude or character, on the other side of that line. Consequently from the cause above stated the ascending as well as the descending movement of the style is altered from what it would be if perfectly free to follow the movements of the air particles acting on the diaphragm. The departures are of course more strongly marked as the complexity of the sound increases, being least noticeable with a simple rhythmical vibration like that of a tuning-fork. The record thus produced will accordingly correspond at parts more or less closely to the form of the sonorous vibrations and at other parts will cease to correspond, and these corresponding and diverse parts will alternate at short intervals, so that a general correspondence to the more prominent features of the sound will be preserved. The record thus produced, studied microscopically, is characterized by short abrupt curves and crests or elevations close together. Necessarily even if the reproducing-style could be caused to follow such a record with perfect accuracy the reproduced sound would not correspond either in volume or character with the original; but at this point another difficulty appears. The end of the rubbing reproducing-style must have a certain minimum diameter and an approximately spherical curvature in order that it may not injure the record. Such a style cannot enter into all the depressions of the record, and, furthermore, the abruptness of the cam-like action of the successive elevations imparts a blow rather than a gradual controlled movement to the stylus, which often throws it off the record, some material portion of which passes before the stylus again makes contact with it.

Another and in some respects more serious defect existing to a greater or less degree in all sound-records heretofore made is that they do not embody an accurate record of the more minute vibrations, which give to sounds their tone color or quality. These vibrations are exceedingly feeble, and the resistance offered by the record material to the recording-stylus, together with the other causes above referred to as modifying the record of the more prominent sonorous vibrations, frequently overcome the minute vibrations mentioned, so that they are not recorded at all, or, if recorded, they become much modified.

The present invention involves a principle which may be briefly stated as follows: The speed imparted to the record-tablet should be such that the crest of each undulation moves from under the recording-style so rapidly that the heel of the latter at no time makes contact with the recording material and that the diaphragm is free to give its full sweep.

The invention therefore consists, primarily, in imparting to the tablet during the recording operation a surface speed which will secure the result stated above. It has been found that a surface speed of about forty-four meters per minute will secure the desired operation. After this speed is attained (which is from two and one-half to three times that ordinarily employed) further increases in speed produce no material improvement in the record.

With a cylindrical recording-style the position of the heel of the style will be determined by the angle which the axis of the style forms with the plane of the recording-surface, (or to the tangent, if it be a cylinder,) and I shall hereinafter refer to the angle which the axis of the style forms with said recording-surface or with said tangent as determining the position of the heel and cutting edge of the style; but it is to be understood that in so doing I do not limit myself to a cylindrical style, as a wedge or other shaped style may be advantageously employed, in which case the angle which the heel of the style forms with the surface of a flat tablet or the tangent of a cylindrical tablet will determine its position.

The record made by this process compared with one made at the same time by the ordinary process shows peculiar and distinguishing structural features. The two, in fact, differ very widely in appearance. The main features of difference are, first, in the new record the amplitude of the vibrations is much greater than that of the corresponding vibrations of the old record, showing the extent to which in the latter the movements of the style were checked; second, in the new record the undulations correspond throughout with the form of the sound-waves, the record presenting a continuous correspondence instead of a discontinuous or partial correspondence; third, the new record contains clearly-defined characters, representative of tone color or quality, which are either wholly absent from the old record or not recorded in such a way as to be capable of acting upon its reproducer; fourth, the undulations of the new record are gradual easy curves, very different in appearance from the sharp angles and short abrupt curves of the ordinary record of commerce. These marked structural peculiarities of the new record can be quite plainly detected visually by the aid of a microscope. Their result acoustically is that the sound delivered by the new record has many times the volume of the sound delivered by the old record and corresponds closely in all its characteristics with the original sound.

The present invention comprises the new method of recording sounds herein described and the new sound-record produced by that method.

Figure 1 of the accompanying drawings shows a recorder with the cutting edge of its stylus embedded in the surface of a cylindrical tablet, the axis of the stylus being at an angle of about twenty degrees with a tangent of the cylinder at the point of contact. Fig. 2 is a diagrammatic view showing the manner in which the vibrations of the recording-diaphragm are damped in the method heretofore employed by reason of the undulations contacting with the heel of the stylus. Figs. 3 and 4 are views of the undulations in the bottom of a record made by the method of the present invention as the same are seen under the microscope. Figs. 5 and 6 are views of the undulations in the bottom of a record made by the old method as seen under the microscope.

The undulations in Figs. 3 and 5 and in Figs. 4 and 6, respectively, are from the same sound recorded at the same time and magnified the same number of diameters.

Referring to Fig. 1, A represents a suitable record-tablet mounted to revolve in the direction indicated by the arrow $x$, and B is a recorder having its cutting-style E embedded in the tablet in the act of forming the record-undulations $y$.

In making sound-records according to the method of the present invention the point of the recording-style is slightly embedded in the surface of the tablet and the latter revolved at a high surface speed such as to leave the diaphragm perfectly free to give its full vibration in response to sonorous vibrations impinging thereon without any contact between the crests of the undulations and the heel of the cutting-style. Obviously the rate of surface speed for the tablet which is necessary to accomplish this result will depend to a certain extent at least upon the angle of the recording-style with the surface of the tablet. The invention may be practiced with a flat or a cylindrical tablet, as desired, and when the latter form is employed the style is preferably placed at an angle of twenty degrees to a tangent of the cylinder at the point where the style makes contact therewith. In the practical formation of sound-records according to the methods heretofore used this has not been feasible.

In Fig. 2 is shown diagrammatically the ordinary operation as heretofore practiced of making a record. The undulations which would be formed by the stylus if the record-surface were moved at the speed heretofore employed is indicated by full lines. These undulations are close together and abrupt in character. As the cutting edge of the stylus descends into the depression succeeding each undulation it moves freely in response to the vibration of the diaphragm until the heel of the stylus makes contact with the crest of the undulation, as shown in Fig. 2, whereupon the cutter ceases to penetrate and the vibration is lost. The depth to which the depression would have been cut had not the stylus been checked by contact with the crest of the undulation is indicated by dotted lines under each depression; but this does not represent all the loss to the height of the undulations, for by damping the swing of the diaphragm in its downward direction its reactionary swing to the opposite side of its medial position is checked or lessened to substantially an equal amount, so that the loss is on the crest of the undulation, as well as in the depression. This, it will be observed, is not merely a loss in amplitude or power, but also a loss in the character of the record during such period, be it longer or shorter, as the style fails to move in strict accordance with the sound-vibration. Were the diaphragm and stylus free to make their full swing without any damping effect due to the contact of the style with crests of the undulations, the crests of the latter and the depressions or valleys between them would be represented by the dotted lines of Fig. 2. It will be apparent from this diagrammatic illustration that the amplitude of vibration imparted to the reproducing-diaphragm by the undulations of a record as heretofore formed must of necessity be much less than that imparted to the air particles by the original sounds and that therefore the reproduced sounds will not be nearly so loud as the originals.

In the practical making of sound-records prior to the present invention the record-tablets have usually been in the form of cylinders of wax-like material about one-half decimeter in diameter revolving at about one hundred and ten revolutions per minute, giving a surface speed to the tablet of about one hundred and seventy-five decimeters, in round numbers. By the present invention the surface speed of the tablet is such as to give the revolving diaphragm perfect freedom of vibration without any damping effect due to the contact of the undulation with the heel of the stylus. The requisite surface speed might be attained by increasing the number of revolutions per minute given to cylinders one-half decimeter in diameter, or thereabout, as heretofore employed. There are practical objections to this, however, and it is therefore preferable to drive the cylindrical tablet at the same number of revolutions—viz., about one hundred and ten per minute—and to so increase the diameter of the tablet as to secure the requisite surface speed, and it has been found that a cylinder about one and one-fourth (1.25) decimeters in diameter will attain a sufficient surface speed when revolved at the rate mentioned. Obviously the same results might be obtained by increasing the number of revolutions and making the diameter less than one and one-fourth (1.25) decimeters or by decreasing the number of revolutions and increasing the diameter of the tablet, and such changes would come within the scope of this invention, the essential feature of which is that the surface speed must be such as to permit the diaphragm to make its full sweep without any contact between the heel of the recording-style and the crests of the undulations.

In Fig. 1 is shown a tablet which is preferably about one and one-quarter decimeters in diameter and when practicing the method of the present invention is given approximately one hundred and ten revolutions per minute, thereby attaining a surface speed of about forty-four meters per minute. By giving the tablet this surface speed and causing sonorous vibrations to impinge upon the diaphragm of a recorder whose stylus is in contact with the surface of the tablet a record-groove will be formed therein having undulations with long, gentle, easy slopes as contradistinguished from the short abrupt undulations heretofore formed. The general character of the record-groove thus formed is indicated in an exaggerated degree by the wavy line to the right of the recording-stylus in Fig. 1. This is not intended to be an accurate representation of actual undulations corresponding to sound-waves; but in Figs. 3 and 4 are seen representations of the undulations corresponding to the syllables "Sol" and "Do," respectively, when sung by a barytone voice at about the middle register as such undulations appear when seen under the microscope. In Fig. 5 are represented the undulations of a record-groove corresponding to the syllable "Sol" when sung by a barytone voice and seen under a microscope when the same is recorded by the method used prior to the present invention—that is to say, by imparting to the tablet-surface a speed of about one hundred and seventy-five decimeters per minute—while in Fig. 6 are represented the undulations corresponding to syllable "Do," likewise made by the old method, by a barytone voice and magnified.

It is to be understood that the records whose undulations are represented in Figs. 3 and 5 were made simultaneously from the same voice sounding the same syllable, the undulations being subsequently magnified the same number of diameters, and the same is true of the undulations reproduced in Figs. 4 and 6. Consequently by comparing Fig. 3 with Fig. 5 or Fig. 4 with Fig. 6 the difference in appearance between the old record and the new may be plainly seen.

It will be seen that the undulations of Figs. 3 and 5 made by the method of the present invention have long gentle easy slopes as contradistinguished from the undulations of Figs. 5 and 6 made by the old method, which have short abrupt curves and sharp angles.

Referring again to Fig. 1, in connection with Figs. 3 and 4, it will be seen that by reason of the long gentle easy slopes of the undulations the heel of the stylus will at no time contact with the crest of the receding undulation. As a result of this three highly-important advantages are secured.

First. The amplitude of the undulations is greatly increased—that is, the height of the undulations from the crests thereof to the bottom of the intermediate depressions is much greater. The vibrations of the diaphragm and stylus are not checked or damped, and therefore the crests of the undulations in the record, as well as the depressions between them, will accurately correspond to the full swing of the recording-diaphragm in both directions. This will cause the record to impart to the reproducing-diaphragm vibrations equal in amplitude to those impressed upon the recording-diaphragm by the recorded sounds, and the reproduced sounds will therefore be approximately as loud as the sounds originally recorded.

Second. The angle between the axis of the recording-stylus and the tangent to the cylinder at the point of contact with the stylus need not be more than twenty degrees. This is approaching very nearly the theoretical line of least resistance for the stylus, which line is along said tangent.

Third. The undulations will accurately correspond to the vibrations of the recorded sound-waves without distorting the larger and stronger ones and without distorting or suppressing the more minute and feeble ones. Since the heel of the stylus does not make contact with the undulations, the stylus will be free to cut the undulation in exact response to the action of the stronger sound-waves without distortion. This will be readily understood in connection with the explanation already given, and the decreased resistance, due both to this and to the advantageous angle for the cutting-style, enables the feeble and minute undulations to which tone color or quality is due to more effectively impress themselves upon the style, and through it upon the record. It may be also observed that the increased velocity with which the record-tablet moves also decreases the resistance to the cutting action of the style.

In addition to the advantages thus secured in the formation of the tablet or record greatly-improved results are secured when reproducing from the record thus formed. The long gentle easy slopes of the record act in an even yet forceful manner on the rubbing-style of the reproducer, and thereby impart to the reproducing-diaphragm smooth but positive vibrations exactly corresponding with the undulations of the record. In other words, the reproducing-stylus is in continuous contact with and under the continuous control of the undulatory record. Owing to the entire absence of short abrupt curves in the record, no blows are struck by the undulations upon the rubbing-style, and the foreign vibrations heretofore caused thereby are therefore absent from the reproduced sounds. Furthermore, the rubbing-style will, on account of the long gentle slopes, neither skip over the crests nor across the sharp depressions between the crests, so that the vibrations of the reproducing-diaphragm will be at all times in exact accord with the undulations of the record. In short, by means of the present invention a record corresponding in character and extent to the sonorous vibrations is secured, which record positively imparts to the reproducing-diaphragm vibrations alike in character and extent to those of the recording-diaphragm. The result of this is that the reproduced sounds will be of equal loudness and purity with the original sounds and will possess all these characteristics to which tone color or quality are due.

Having thus described the invention, what is claimed is—

1. The method of forming a sound-record which consists in placing a vibratory cutting-style in contact with a record-tablet, at an acute angle to the tangent at the point of contact, impressing sonorous vibrations upon the style and simultaneously moving the tablet relative to the style with a high surface speed sufficient to prevent the heel of the style from making contact with the undulations, and to cause the style to cut continuously a record corresponding in form to the sound-waves.

2. The method of forming a sound-record which consists in placing a vibratory cutting-style in contact with a record-tablet at a small angle with the tangent at the point of contact, and simultaneously vibrating the style by the action of said waves and moving the tablet with a minimum surface speed of about forty-four meters per minute, substantially as described.

3. The method of forming a sound-record which consists in placing a vibratory cutting-style in contact with a tablet, causing said style to vibrate in a plane approximately perpendicular to the surface of the tablet by impressing sonorous vibrations thereon, and simultaneously moving said tablet at such a speed that sounds requiring one minute in their production form a record approximately forty-four meters in length.

4. The method of forming a sound-record which consists in placing a vibratory recording-style in contact with a cylindrical record-tablet approximately one and one-fourth (1.25) decimeters in diameter and simultaneously vibrating the style by the action of sound-waves and revolving said tablet with a surface speed of approximately forty-four meters per minute.

5. A sound-record consisting of a tablet of wax or wax-like material having an undulatory sound-groove cut or engraved therein, said undulations being of great and varying amplitude and having long, gentle, easy slopes, thereby giving reproductions sensibly equal in volume to the original sounds.

6. A sound-record consisting of a tablet having a sound-groove with undulations of varying depth, said undulations being of such lengths that sounds occupying one minute in their production form a record approximately forty-four meters in length.

7. A sound-record consisting of a cylindrical tablet substantially one and one-quarter decimeters in diameter and having a sound-groove with undulations of varying depth, said undulations being of such lengths that sounds occupying one minute in their production form a record approximately forty-four meters in length.

In testimony whereof I have signed this specification in the presence of two subscribing witnesses.

THOMAS H. MACDONALD.

Witnesses:
 REEVE LEWIS,
 PHILIP MAURO.